United States Patent
Sargent et al.

[11] Patent Number: 5,833,417
[45] Date of Patent: Nov. 10, 1998

[54] ADJUSTABLE CLAMPING ASSEMBLY

[75] Inventors: Charles L. Sargent, Bonita Springs; Daniel S. Carter, Ft. Myers, both of Fla.

[73] Assignee: Quality Boat Lifts, Inc., Fort Myers, Fla.

[21] Appl. No.: 798,106

[22] Filed: Feb. 12, 1997

[51] Int. Cl.$^6$ .................................................. F16B 27/00
[52] U.S. Cl. ............................ 411/85; 411/432; 248/58
[58] Field of Search .......................... 248/223.41, 221.11, 248/220.21, 244, 224.51, 220.22, 222.52, 225.11; 411/84, 85, 104, 432, 81; 403/403, 406.1, 348, 405.1, 247, 256, 258, 260

[56] References Cited

U.S. PATENT DOCUMENTS

| | | | |
|---|---|---|---|
| 4,784,552 | 11/1988 | Rebentisch | 411/85 |
| 4,830,531 | 5/1989 | Condit et al. | 403/348 |
| 4,948,313 | 8/1990 | Zankovich | 411/85 |
| 5,078,537 | 1/1992 | Normura | 403/406.1 |
| 5,271,586 | 12/1993 | Schmidt | 248/58 |
| 5,489,173 | 2/1996 | Hofle | 411/85 |
| 5,628,598 | 5/1997 | Höfle | 411/85 |
| 5,655,865 | 8/1997 | Plank et al. | 411/85 |

*Primary Examiner*—Leslie A. Braun
*Assistant Examiner*—T. Le
*Attorney, Agent, or Firm*—William E. Noonan

[57] ABSTRACT

An adjustable clamping assembly is provided for holding and supporting a conventional structural component. The assembly includes a support element having an elongate channel that employs a pair of longitudinal locking grooves. A screw-like component is engaged with a structural component and a clamping nut is aligned with and inserted into the channel at a selected location. The nut includes a pair of locking tabs and a latch mechanism for permitting the nut to be rotated from an aligned orientation to a generally perpendicular orientation within the channel, wherein the locking tabs are respectively inserted in the locking grooves. The latch mechanism holds the nut in the perpendicular orientation to prevent removal of the nut from the channel. The nut further includes a threaded opening that is operably engaged by the screw-like component to attach the structural component to the support element at the selected location.

26 Claims, 6 Drawing Sheets

ADJUSTABLE CLAMPING ASSEMBLY

FIELD OF THE INVENTION

This invention relates to an adjustable clamping assembly and, more particularly, to an assembly for clamping and supporting conventional structural components, such as steps, walkways, bunkboards and guideposts, used in boat lifts.

BACKGROUND OF THE INVENTION

The marine industry, and more particularly, the boat lift industry, employs a variety of standard structural components that must be mounted or supported in some fashion. For example, most boat lifts require elements such as bunkboards, walkways, guideposts and/or steps. These components are typically mounted to elongate beams or extrusions used in the boat lift.

Presently, the aforementioned structural components are secured in place on the boat lift by metal mounting plates or brackets. The plates are secured to the structural components by stainless steel bolts. Unfortunately, these plates and bolts tend to gall, corrode and otherwise deteriorate over time. Such deterioration is accelerated in a marine environment. This seriously hinders subsequent removal of the mounting assembly. Such removal may be required, for example, to repair or replace the structural component or to adjust its position on the lift. Corroded bolts and plates must be sawed or otherwise cut off the boat lift. These mounting components obviously cannot be reused and must be replaced with new pieces. Considerable time, effort and expense is required to remount the structural components to the boat lift. Eventually, the new mounting assembly will likewise deteriorate and require replacement. This presents a recurring problem.

SUMMARY OF INVENTION

It is therefore an object of the present invention to provide an improved clamping assembly for securing standard structural components such as bunkboards, bumpers, guideposts, walkways and steps to a boat lift.

It is a further object of this invention to provide an adjustable clamping assembly that is quick and simple to attach and remove, as required.

It is a further object of this invention to provide an adjustable clamping assembly that is extremely durable and effectively resists corrosion, galling and other deterioration, even in a marine environment.

It is a further object of this invention to provide an adjustable clamping assembly that may be effectively reused a number of times.

It is a further object of this invention to provide an adjustable clamping assembly that enables structural components to be repaired, replaced and adjusted much more quickly, simply and inexpensively than has heretofore been possible.

It is a further object of this invention to provide a clamping assembly that securely fastens a structural component to an elongate beam or extrusion and which effectively resists inadvertent loosening or dislodgment.

It is a further object of this invention to provide a clamping assembly that is freely adjustable along the length of a beam or other structural support element.

It is a further object of this invention to provide a clamping assembly that may be used effectively in a wide variety of applications and environments outside of the marine industry.

This invention results from a realization that an adjustable clamping assembly, particularly suited for use in boat lifts, may be achieved by employing a plastic two stage nut that is received in the longitudinal channel of an elongate beam or extrusion. This invention results from the further realization that secure clamping is achieved by providing a latch in the upper stage of the nut, which locks the nut in position within the channel when the nut is rotated approximately 90 degrees in the channel. Such positioning is further assisted by employing in the lower stage of the nut a pair of spring tabs that bear against the sides of the channel when the nut is latched in position.

This invention relates to an adjustable clamping assembly for holding and supporting a conventional structural component. The assembly includes a support element having an elongate channel that includes a pair of longitudinal locking grooves. A screw-like element is engaged with the structural component. A clamping nut is aligned with and inserted into the channel at a selected location. The nut includes a pair of locking tabs and latch means for permitting the nut to be rotated from an aligned orientation to a generally perpendicular orientation within the channel, wherein the locking tabs are respectively inserted in the locking grooves, and for holding the nut in the perpendicular orientation to prevent removal of the nut from the channel. The clamping nut further includes a threaded opening that is operably engaged by the screw-like element to attach the structural component to the support element at the selected location.

In a preferred embodiment, the channel may include a relatively narrow entry section and a relatively wide interior section. The locking grooves are formed in the interior section. The channel may include a lower longitudinal recess adjacent to the interior section. This recess receives a leading end of the screw-like component.

Each locking tab may include a resilient bearing portion having a curved surface and frictionally engaging a respective locking groove when the nut is in the perpendicular orientation to hold the nut at the selected location in the channel. The tab may include a pair of resilient, curved elements.

The latch means may comprise a pair of resiliently flexible latch members that are flexed open when the nut is rotated from the aligned orientation to the generally perpendicular orientation within the channel. The latch members are biased closed when the nut is in the generally perpendicular orientation to hold the nut in that orientation. The latch means may also include at least one stop that engages the support element and prevents the nut from being rotated beyond the generally perpendicular orientation.

The clamping nut may include receptacle means for receiving a torque generating tool to assist rotation of the nut. The nut may also include a relatively short upper portion and a relatively long lower portion interconnected to the upper portion. The lower portion preferably has a length that is greater than the width of the entry section of the channel. The nut has a width that is less than the width of the entry section of the channel and, as a result, is aligned with and inserted into the channel at the selected location such that the lower portion of the nut is received in the interior section of the channel and the upper portion of the nut is received in the entry section of the channel. When the nut is rotated into the generally perpendicular orientation, the lower portion of the nut extends laterally across the interior section of the channel to prevent removal of the nut from the channel.

The locking tabs are typically formed in the lower portion of the nut. The latch means are preferably formed in the upper portion of the nut. The upper and lower portions of the nut are preferably unitarily joined and comprise a molded plastic construction.

BRIEF DESCRIPTION OF THE DRAWINGS

Other objects, features and advantages will occur from the following description of preferred embodiments and the accompanying drawings, in which.

DETAILED DESCRIPTION OF PREFERRED EMBODIMENTS

Figure 1:
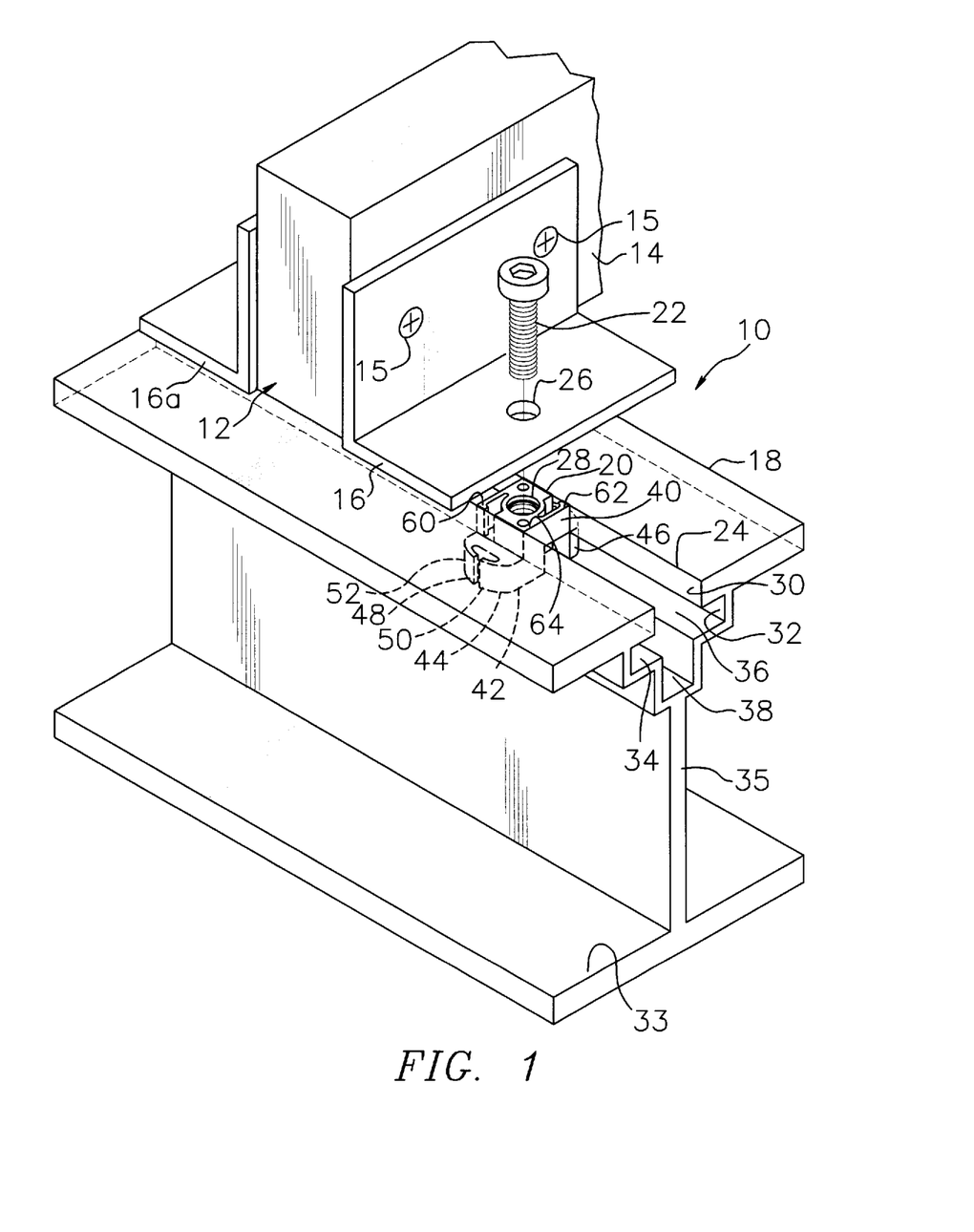
FIG. 1 is a perspective, partially exploded view of the clamping assembly of this invention and a structural component that is being supported by the clamping assembly.

There is shown in FIG. 1 an adjustable clamping assembly 10 that is used to hold and support a conventional structural component 12. As described herein, component 12 comprises a standard structural piece of the type used in a boat lift. For example, structural component 12 may include a bunkboard 14. Alternatively, the conventional structural component may comprise a walkway, bumper, step, guidepost, beam or some other variety of boat lift structure. It should also be understood that the conventional structural component may comprise any one of a wide selection of components used in applications other than boat lifts. Clamping assembly 10 is intended to secure virtually any form of structural member in place along a beam, extrusion or other support element. In the version described herein, bunkboard 14 is secured to the clamping assembly through a pair of angled brackets 16 and 16a. Bracket 16 is secured to bunkboard 14 by screws or bolts 15. Analogous mounting bracket 16a is formed on the other side of elongate bunkboard 14. The precise manner of interconnection between these brackets and the clamping assembly is described more fully below.

Clamping assembly 10 particularly includes an elongate support element or beam 18, which is attached to and supports structural component 12. The clamping assembly further includes an adjustable plastic nut 20 and a screw-like component, namely a bolt 22. Component 22 and nut 20 are operably interengaged to secure component 12 to structural element 18. In particular, nut 20 is received and held in a longitudinal channel 24 formed in support element 18. Bolt 22 is engaged with a hole 26 in bracket 16 and a corresponding aligned hole 28 formed through nut 20. Hole 28 is threaded so that when bolt 22 is tightened into nut 20, bracket 16 and structural component 12 are secured to support element 18. Bracket 16a is similarly secured by an analogous clamping assembly that is hidden from view in FIG. 1.

Figure 2:
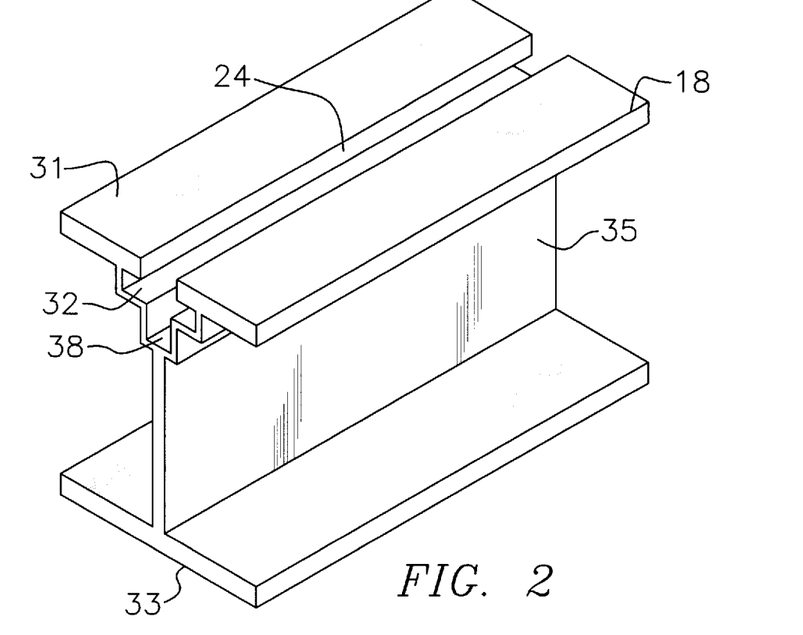
FIG. 2 is a perspective view of the support element and its longitudinal channel.
Figure 3:
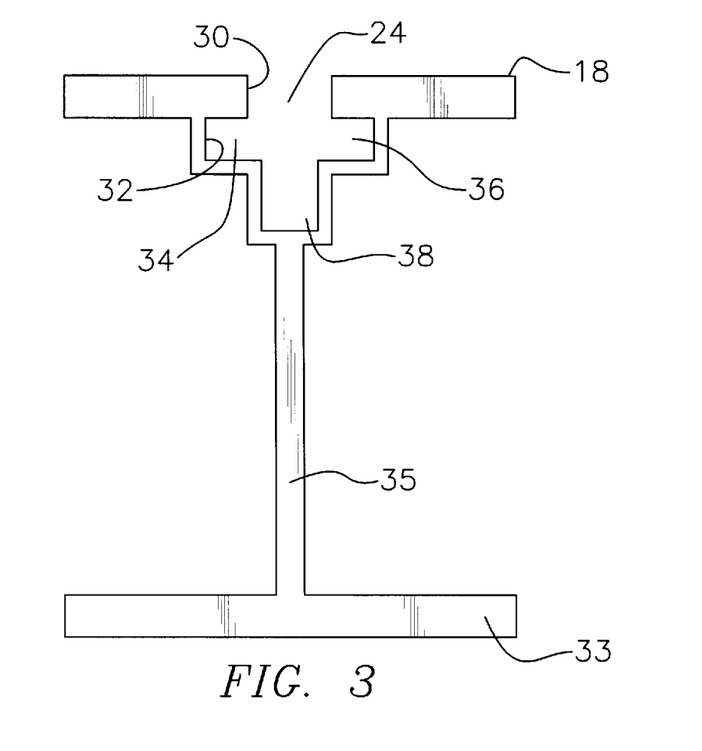
FIG. 3 is an elevational end view of the support channel.

As illustrated in FIGS. 1–3, support element 18 generally resembles an I-beam. The support element includes an upper support flange 31, a lower support flange 33 and a generally vertical intermediate section 35 disposed between flanges 31 and 33. This component may be extruded, welded or formed according to other various other known manufacturing techniques. Preferably, however, the beam is extruded so that channel 24 is most conveniently formed. The longitudinal channel depends from upper support flange 31 and extends for most of, if not the entire length of element 18. Channel 24 generally interconnects the upper support flange and the intermediate section 35. The channel maintains the cross sectional shape best shown in FIG. 3 for the entire length of the channel. More particularly, channel 24 includes a relatively narrow entry section 30 and a relatively wide interior section 32. The interior section includes a pair of longitudinal locking grooves 34 and 36 that are formed beneath the lips defining entry section 30. A lower longitudinal recess 38 is formed adjacent to and immediately beneath interior section 32.

Clamping nut 20, shown alone in FIGS. 4–7, comprises a molded, one-piece plastic construction. Preferably, nylon or some similar durable plastic material is employed. The clamping nut should exhibit some degree of resilience. It should be relatively easy to turn, resist corrosion and not jam. Nut 20 includes a relatively short upper portion 40 and a relatively long lower portion 42. As best illustrated in FIG. 1, lower portion 42 has a length that is greater than the width of channel entry section 30. The length of the lower portion is approximately equal to or minutely larger than the width of interior channel section 32.

More particularly, lower nut portion 42 includes a pair of locking tabs 44 and 46 formed at respective longitudinal ends of lower portion 42. Each locking tab includes a resilient bearing portion 48 that features a pair of opposing curved, resilient fingers 50 and 52. Curved bearing surfaces 48 engage the side walls of interior channel section 32 when the clamping nut is latched in the manner described below.

Upper nut portion 40 includes means for latching the nut in place at a selected location in longitudinal channel 24. More particularly, as shown in FIGS. 1, 4, 5 and 6, upper nut portion 40 includes a pair of integral latch members 60 and 62. Each latch member includes a flexible, generally L-shaped finger that is unitarily interconnected to the body 64 of upper portion 40. The lower edge of each of the fingers 60 and 62 is split and separated from lower nut portion 42. As a result, each latch member effectively employs a cantilevered construction. The latch members may be flexed inwardly as best indicated by the arrows in FIGS. 5 and 6. The resilience in each cantilevered latch member urges it to maintain the unflexed condition shown in the drawings. Upper portion 40 also includes a pair of stops 65 and 66 shown in FIGS. 4, 6 and 7. As will be explained more fully below, these stops limit the degree to which the clamping nut may be rotated in channel 24.

Figure 4:
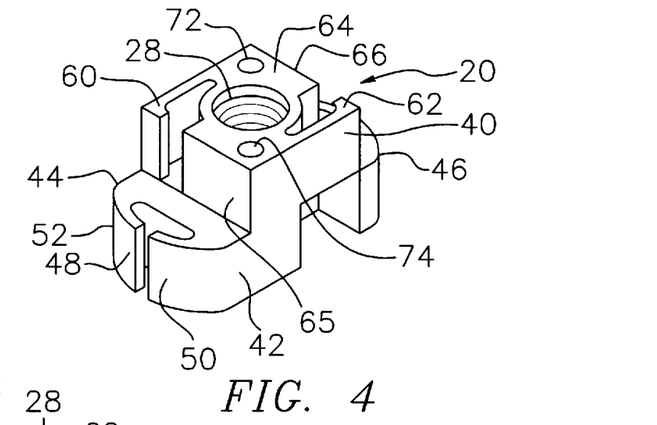
FIG. 4 is a perspective view of the clamping nut.
Figure 5:
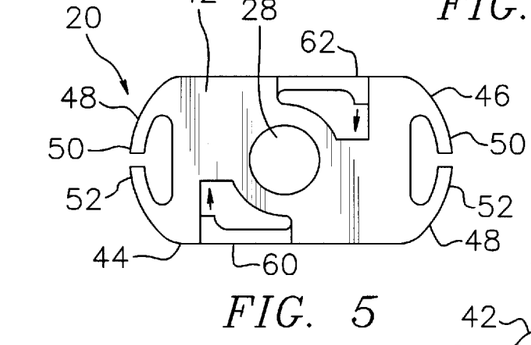
FIG. 5 is a bottom plan view of the clamping nut.
Figure 6:
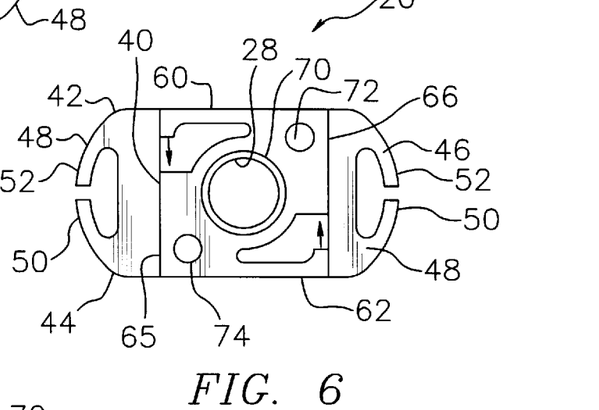
FIG. 6 is a top plan view of the clamping nut.
Figure 7:
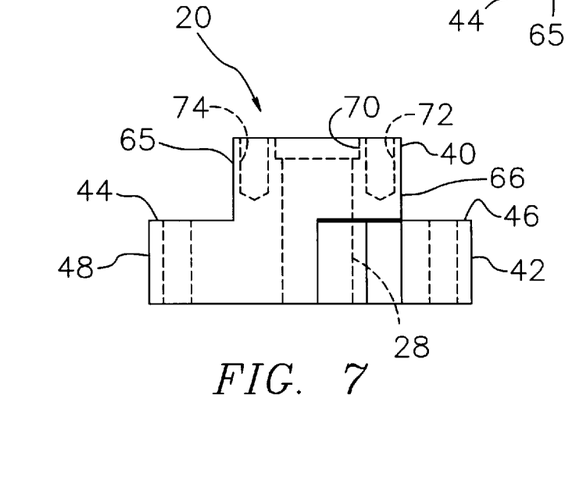
FIG. 7 is a elevational side view of the clamping nut.

Central hole 28 extends completely through nut 20 from top to bottom. As best shown in FIGS. 6 and 7, hole 28 includes an enlarged entry 70 formed in upper portion 40. A pair of receptacles 72 and 74, FIGS. 4, 6 and 7 are also formed in upper portion 40. An optional torque generating tool, such as pliers, a wrench, a forked instrument or another such device may be inserted into holes 72 an 74 to help turn the nut in the manner that will be described more fully below.

Figure 8:
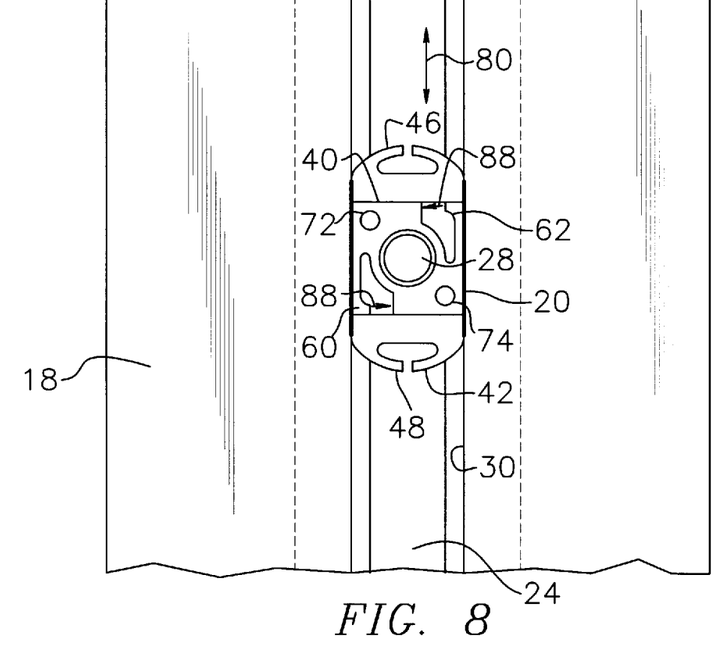
FIG. 8 is a top view of the nut aligned with and inserted in the channel.
Figure 9:
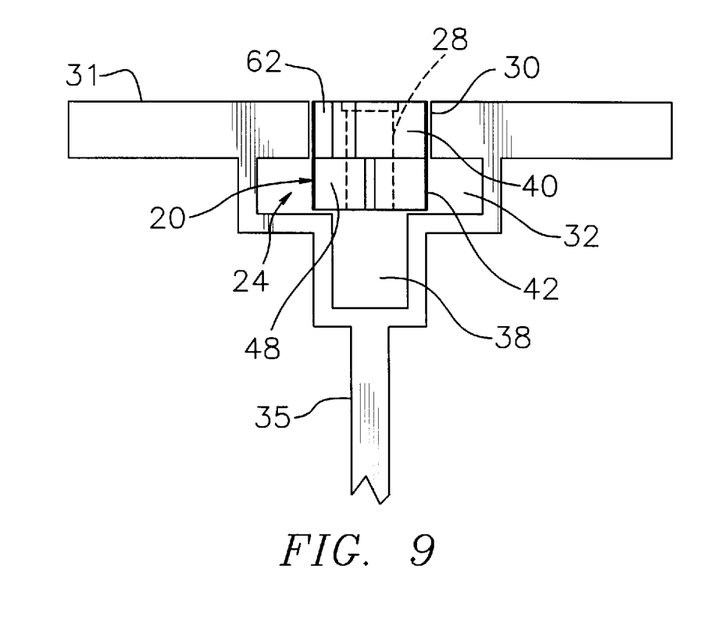
FIG. 9 is an elevational end view of the clamping assembly and attached structural component with the nut in its aligned orientation.

FIG. 1 and FIGS. 8–11 illustrate how the clamping assembly is installed and operated. Initially, as shown in FIG. 8, clamping nut 20 is introduced at a desired location along channel 24. The installer first determines where the conventional structural component is to be installed on support element 18. Nut 20 is then placed proximate that location and aligned with channel 24. The longitudinal channel and the nut are manufactured such that the nut has a width slightly less than the width of the channel's entry section 30. Nut 20 is aligned with channel 24 in the manner shown in FIG. 8 and inserted into the channel such that upper portion 40 is received in channel entry section 30 and lower portion 42 is received in interior channel section 32. See FIG. 9. In this condition, latch members 60 and 62 are aligned along respective sides of channel entry section 30. At the same time, resilient tabs 46 and 48 of lower nut portion 42 face in opposite directions along interior section 32 of channel 24. In this aligned orientation, nut 20 may be freely adjusted to any desired location along the support element 18 simply by sliding the nut in channel 14 as indicated by double-headed arrow 80 (FIG. 8). As illustrated in FIG. 9, there is sufficient clearance between the sides of the channel and nut 20 to allow the nut to slide freely along the channel. The plastic construction of the nut also facilitates such movement.

Figure 10:
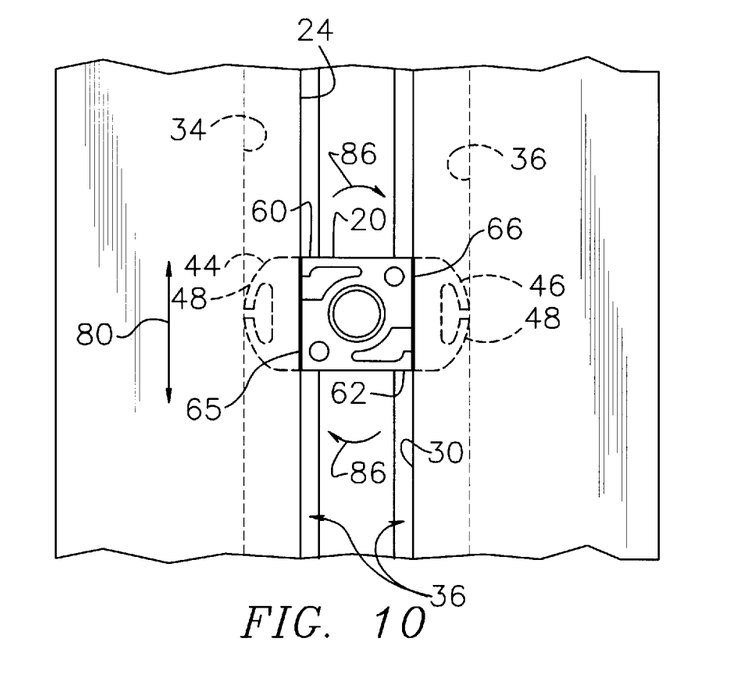
FIG. 10 is a top view of the nut rotated into the perpendicular orientation within the channel.

After nut 20 is properly positioned along channel 24, it is rotated and locked in place in the manner illustrated in FIG. 10. With nut 20 initially in the aligned orientation shown in FIGS. 8 and 9, the installer grasps the nut, preferably using a tool that is inserted into receptacles 72 and 74. The installer then rotates nut 20 in a clockwise direction, as indicated by arrows 86 in FIG. 10. The flexibly resilient cantilevered latching fingers 62 and 60 engage respective sides of channel entry section 30, FIG. 8. and fingers 60 and 62 flex inwardly in the manner indicated by arrows 88. This permits nut 20 to rotate approximately 90 degrees into the generally perpendicular orientation illustrated in FIG. 10. As the lower nut portion 42 turns, curved bearing surfaces 48 of tabs 44 and 46 allow the lower nut portion to slidably engage the sides of locking grooves 34 and 36, respectively. In this position, the resilient latching fingers 60 and 62 resume their normal unflexed positions. Stop 66 engages one side of entry section 30 and stop 65 interengages the opposite side of the entry section. This prevents nut 20 from being rotated beyond the perpendicular orientation illustrated in FIG. 10. At the same time, the distal ends of latching finger 60 and 62 restrict the nut from being rotated in a reverse direction toward its original aligned orientation (FIG. 9). As a result, nut 20 is held latched in the generally perpendicular orientation illustrated in FIG. 10. In this condition, locking tab 44 is received in locking groove 34 and locking tab 46 is similarly received in locking groove 36. Surfaces 48 of tabs 44 and 46 bear snugly against opposing side walls of interior channel section 36. As a result, nut 20 is held firmly in place at the selected location along channel 74. Unintended sliding of the nut in the direction of double headed arrow 80 is prevented. At the same time, the resilient elements of bearing surfaces 48 permit the nut to be slid back and forth along the channel, as required, if sufficient force is applied to the nut. In other words, the nut may be slid back and forth if urged by an installer, but unintended sliding is prevented.

Figure 11:
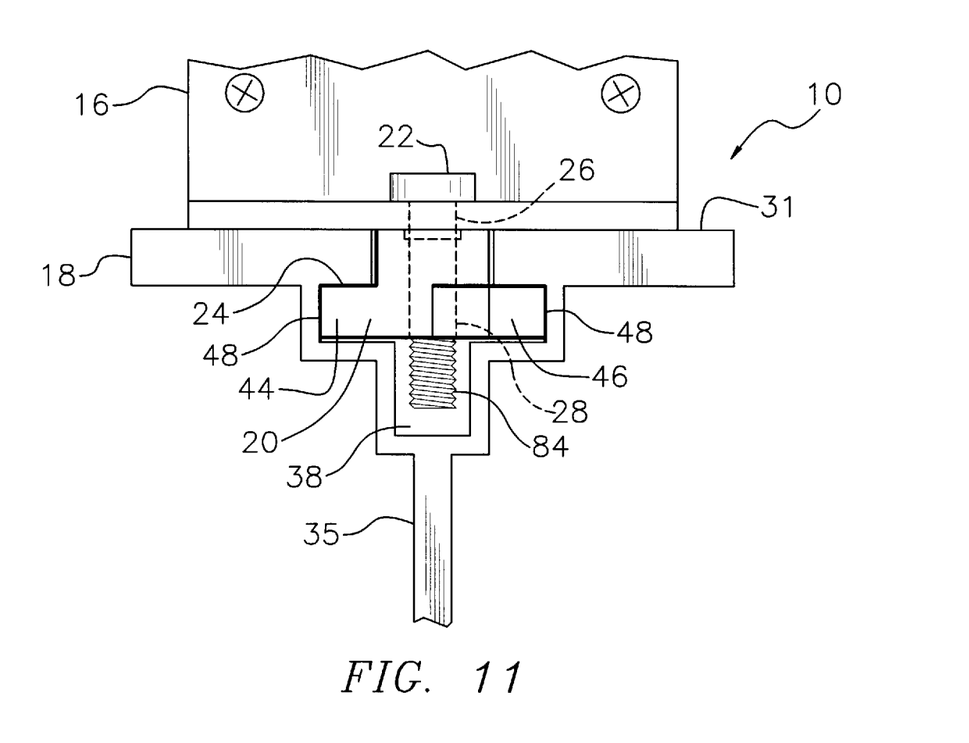
FIG. 11 is an elevational end view of the clamping assembly with the nut in the perpendicular orientation that locks the clamping assembly in place.

Assembly is completed in the manner illustrated in FIG. 11. After nut 20 is positioned and latched in the manner illustrated in FIG. 10, the standard structural component (including bracket 16) is positioned on support flange 31 such that bracket hole 26 is aligned with hole 28 in nut 20. Bolt 22 is interengaged with the aligned holes 26 and 28. In particular, hole 28 includes a circumferential thread that is operably interengaged by the thread of bolt 22. The bolt is tightened into the latched nut until the lower end 84 of bolt 22 extends into recess 38 of channel 24. Bolt 22 is tightened fully and nut 20 is drawn up against the lower surface of support flange 31 to clamp bracket 16 and its attached structural component (i.e. bunkboard 14, FIG. 1) securely in place on support element 18. When required, identical clamps may be used in a similar fashion to interconnect other portions of the structural component to support element 18 and to other support elements in the boat lift. When the bolt is fastened in the above-described manner, the clamp is attached securely to the structural component being supported. The cantilevered latching fingers, the stops and the resilient bearing surfaces of the locking tabs prevent the nut from turning relative to the bolt and loosening the clamp. Reliable clamping is thereby maintained.

Over time, it may be required to reposition the structural component along the support element. Alternatively, from time to time, the nut, bolt or other components may be need to be replaced. In such situations, the clamping assembly may be disassembled quickly and conveniently. First, bolt 22 is loosened and disengaged from nut 20. Bracket 16 and the attached structural component are removed from the support element. Nut 20 may then repositioned and/or removed in a number of ways. To reposition the nut in the channel, the nut is simply slid along the channel by simply applying enough force to overcome the frictional resistance provided by bearing surfaces 48. To remove the nut completely, the installer squeezes cantilevered latching fingers 60 and 62 inwardly, as illustrated by arrows 88 in FIG. 8. This can be done either manually or using an appropriate pliers or other tools. Nut 20 is then rotated in a counterclockwise direction from the perpendicular orientation shown in FIG. 10 to the aligned orientation shown in FIG. 8. When the nut is in the position illustrated in FIG. 8, is may be removed by simply lifting it out of the channel. Appropriate repair and/or replacement of parts may then be performed. Reinstalling the clamping assembly is then accomplished in the manner previously described.

Figure 12:
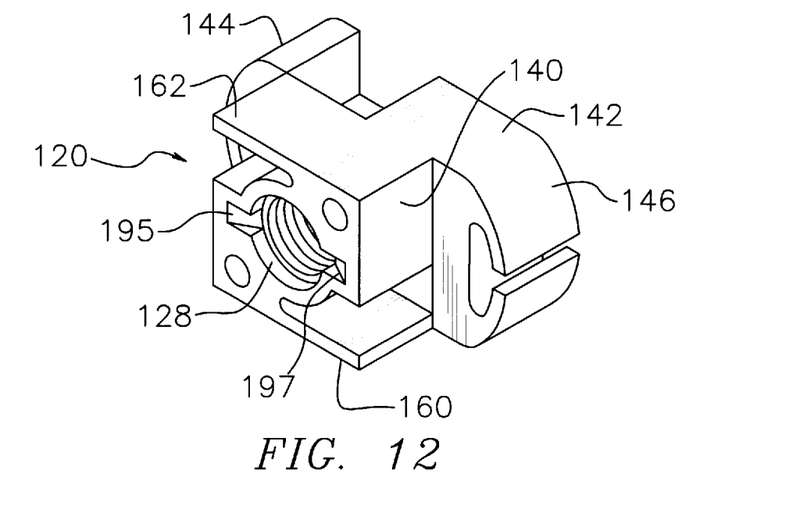
FIG. 12 is a top perspective view of an alternative preferred clamping nut according to this invention.
Figure 13:
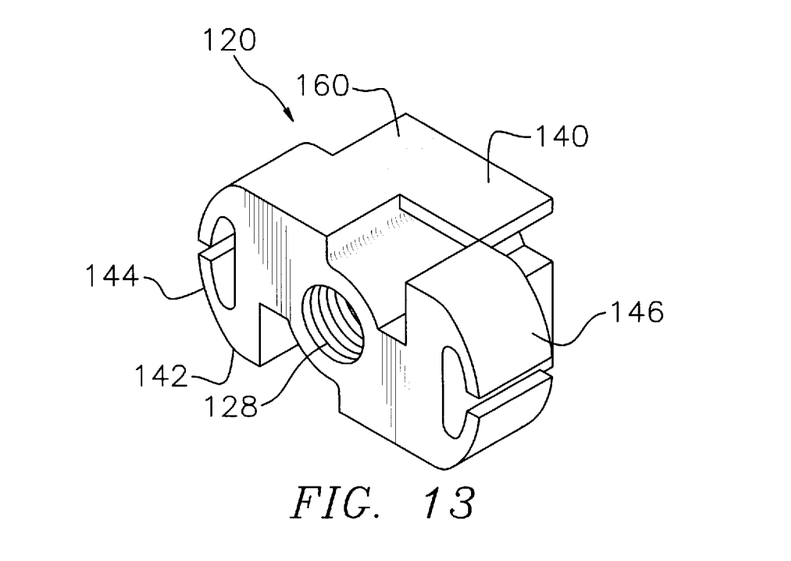
FIG. 13 is a bottom perspective view of the nut of FIG. 12.

An alternative preferred clamping nut 120 is illustrated in FIGS. 12 and 13. As in the previously described embodiment, nut 120 comprises a molded, one-piece plastic construction. A relatively short upper portion 140 is unitarily connected to a lower portion 142. The lower portion includes locking tabs 144 and 146 that are constructed and operate in a manner identical to the locking tabs previously described. A pair of integral latch members 160 and 162 are carried by upper portion 140. In this embodiment, the latch elements comprise substantially flat, flexible fingers, in contrast to the L-shaped flexible fingers utilized in the prior embodiment. Nonetheless, the manner of operation of latch elements 160 and 162 is identical to the function previously described.

As best illustrated in FIG. 12, a pair of aligned slotted segments 195 and 197 extend from central hole 128. Hole 128 is countersunk to receive a screw or bolt in the manner described above. Nut 120 is utilized in a manner analogous to the previously described embodiment. Before the bolt is attached, nut 120 is rotated by inserting a coin or a similar flat element edgewise into slotted segments 195 and 197.

The coin or other flat element may then be turned in the installer's fingers to rotate nut 120 from the aligned orientation analogous to that shown in FIGS. 8 and 9 to the perpendicular orientation shown in FIGS. 10 and 11. In this way, the nut may be turned by means other than the installer's fingers or a wrench-type tool.

Therefore, the present invention permits standard structural components to be mounted and secured to a support element in a very quick, convenient and reliable fashion. The clamping assembly is extremely durable, resists corrosion and premature deterioration, and effectively avoids unintended loosening and dislodgment. The use of a plastic, corrosion resistant nut makes the assembly particularly effective for use in marine and other normally corrosive environments. However, the invention may also be beneficially employed for various other applications and for multiple purposes in the building and construction industries.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. An adjustable clamping assembly comprising:
    a support element having an elongate channel that includes at least one longitudinal locking groove;
    a threaded, screw-like component that is engagable with a conventional structural component; and
    a clamping nut that is aligned with and inserted into said channel at a selected location, said nut including a locking tab and latch means for permitting said nut to be partially rotated in a first direction from a generally aligned orientation to a generally perpendicular orientation within said channel, wherein said locking tab is inserted in said locking groove, and for preventing rotation of said nut in a second direction and holding said nut in said perpendicular orientation to prevent removal of said nut from said channel;
    said clamping nut further including a threaded opening that is operably engaged by said screw-like component to attach the structural component to the support element at said selected location.

2. The assembly of claim 1 in which said channel includes a relatively narrow entry section and a relatively wide interior section, said locking groove being formed in said interior section.

3. The assembly of claim 2 in which said channel includes a lower longitudinal recess adjacent said interior section, which recess receives a leading end of said screw-like like component engaged with said clamping nut.

4. The assembly of claim 1 in which said locking tab includes a resilient bearing portion having a curved surface and frictionally engaging a respective locking groove when said nut is in said generally perpendicular orientation to hold said nut at said selected location in said channel.

5. The assembly of claim 4 in which said tab includes at least one resilient, curved element.

6. The assembly of claim 1 in which said latch means comprise at least one resilient flexible latch member that is flexed open when said nut is rotated from said aligned orientation to said generally perpendicular orientation within said channel and that is biased closed when said nut is in said generally perpendicular orientation to hold said nut in said generally perpendicular orientation.

7. The assembly of claim 6 in which said latch means, includes a stop that engages said support element and prevents said nut from being rotated beyond said generally perpendicular orientation.

8. The assembly of claim 1 in which said nut includes receptacle means for receiving a torque generating tool to assist rotation of said nut.

9. The assembly of claim 1 in which said channel includes a pair of longitudinal locking grooves and said nut includes a corresponding pair of locking tabs, each said groove receiving a respective said tab when said nut is in said perpendicular orientation.

10. An adjustable clamping assembly comprising:
    a support element having an elongate channel, said channel including a relatively narrow entry section and a relatively wide interior section;
    a threaded, screw-like component that is engagable with a conventional structural component; and
    a clamping nut that includes a relatively short upper portion and a relatively long lower portion interconnected to said upper portion, said lower portion having a length that is greater than the width of said entry section of said channel, said nut having a width that is less than the width of said entry section and being aligned with and inserted into said channel at a selected location along said channel such that said lower portion of said nut is received in said interior section of said channel and said upper portion of said nut is received in said entry section of said channel;
    said nut further including latch means for permitting said nut to be partially rotated in a first direction into a generally perpendicular orientation within said channel, wherein said lower portion of said nut extends laterally across said interior section of said channel, and for preventing rotation of said nut in an opposite second direction and holding said nut in said generally perpendicular orientation to prevent removal of said nut from said channel, and a threaded opening that is operably engaged by said screw-like component to attach the structural component to said support element at said selected location.

11. The assembly of claim 10 in which said channel includes a lower longitudinal recess adjacent said interior section, which recess receives a leading end of said screw-like component engaged with said clamping nut.

12. The assembly of claim 10 in which said lower portion includes a locking tab located on an end thereof, said interior section of said channel including a longitudinal locking groove which respectively receives said locking tab when said nut is rotated into said generally perpendicular orientation.

13. The assembly of claim 12 in which said locking tab includes a resilient bearing portion having a curved surface and frictionally engaging said locking groove when said nut is in said perpendicular orientation to hold said nut at said selected location in said channel.

14. The assembly of claim 13 in which said tab includes at least one resilient, curved elements.

15. The assembly of claim 10 in which said latch means are formed in said upper portion of said nut and comprise at least one of resiliently flexible latch member that is flexed open when said nut is rotated from said aligned orientation to said generally perpendicular orientation within said channel and that is biased closed when said nut is in said generally perpendicular orientation to hold said nut in said generally perpendicular orientation.

16. The assembly of claim 15 in which said latch means includes at least one stop that engages said entry section of said channel and prevents said nut from being rotated beyond said generally perpendicular orientation.

17. The assembly of claim 10 in which said nut includes receptacle means formed in said upper portion for receiving a torque generating tool to assist rotation of said nut.

18. The assembly of claim 10 in which said upper and lower portions of said nut are unitarily joined.

19. A boat lift assembly comprising:

a boat lift that includes a support element having an elongate channel, said channel including a longitudinal locking groove;

a structural component;

a threaded, screw-like component that is engaged with said structural component; and a clamping nut that is slidably received in said channel and includes a locking tab, said tab being received in said locking channel, said clamping nut further including a threaded opening that is operably engaged by said screw-like component to attach the structural component to the support element at a selected location along said channel;

said channel having a relatively narrow entry section and a relatively wide interior section, and said nut including a relatively short upper section and a relatively long lower portion interconnected to said upper portion, said lower portion having a length that is greater than the width of said entry section, said nut extending laterally across said channel such that said locking tab is received in said locking groove to hold said nut in said channel, said nut further including latch means for permitting said nut to be partially rotated in a first direction to align said nut with said channel, and for preventing rotation of said nut in an opposite second direction in said channel to prevent removal of said nut from said channel through said entry section.

20. The assembly of claim 19 in which said channel has a relatively narrow entry section and a relatively wide interior section, and said nut includes a relatively short upper section, a relatively long lower portion interconnected to said upper portion, said lower portion having a length that is greater than the width of said entry section; said nut extending laterally across said channel such that said locking tab is received in said locking groove to hold said nut in said channel, said nut further including latch means for preventing said nut from being rotated in a first direction, but permitting said nut to be selectively rotated in an opposite second direction in said channel to align said nut with said channel and point said nut to be removed from said channel through said entry section.

21. The assembly of claim 19 in which said tab is formed in said lower portion of said nut and at an end thereof.

22. The assembly of claim 26 in which said tab includes a resilient bearing portion having a curved surface and frictionally engaging said locking groove when said nut is in said perpendicular orientation to hold said nut at said selected location in said channel.

23. The assembly of claim 19 in which said tab includes at least one resilient, curved element.

24. The assembly of claim 19 in which said latch means are formed in said upper portion of said nut and comprise at least one of resiliently flexible latch member that is flexed open when said nut is rotated from said aligned orientation to said generally perpendicular orientation within said channel and that is biased closed when said nut is in said generally perpendicular orientation to hold said nut in said generally perpendicular orientation.

25. The assembly of claim 19 in which said channel includes a pair of longitudinally locking grooves and said nut includes a corresponding pair of locking tabs that are respectively received by said grooves.

26. A boat lift assembly comprising:

a boat lift that includes a support element having an elongate channel, said channel including a longitudinal locking groove;

a structural component;

a threaded, screw-like component that is engaged with said structural component and a clamping nut that is slidably received in said channel and includes a locking tab, said tab being received in said locking channel, said clamping nut further including a threaded opening that is operably engaged by said screw-like component to attach the structural component to the support element at a selected location along said channel, said tab including at least one resilient curved element.

* * * * *